(12) United States Patent  (10) Patent No.: US 8,887,699 B2
Schliesche et al.  (45) Date of Patent: Nov. 18, 2014

(54) DRIVE DEVICE

(75) Inventors: Dirk Schliesche, Billigheim (DE); Andreas Didion, St. Wendel (DE)

(73) Assignee: BorgWarner Inc., Auburn Hills, MI (US)

( * ) Notice: Subject to any disclaimer, the term of this patent is extended or adjusted under 35 U.S.C. 154(b) by 346 days.

(21) Appl. No.: 13/146,507

(22) PCT Filed: Jan. 29, 2010

(86) PCT No.: PCT/US2010/022468
§ 371 (c)(1),
(2), (4) Date: Oct. 7, 2011

(87) PCT Pub. No.: WO2010/088438
PCT Pub. Date: Aug. 5, 2010

(65) Prior Publication Data
US 2012/0017878 A1 Jan. 26, 2012

(30) Foreign Application Priority Data
Feb. 2, 2009 (DE) .......................... 10 2009 006 930

(51) Int. Cl.
F02B 37/12 (2006.01)
F02M 35/024 (2006.01)
B60K 6/48 (2007.10)
F02M 33/04 (2006.01)
B60W 10/06 (2006.01)
F02M 23/12 (2006.01)
B60W 20/00 (2006.01)

(52) U.S. Cl.
CPC ............ *F02M 35/024* (2013.01); *Y02T 10/126* (2013.01); *Y02T 10/6221* (2013.01); *B60Y 2400/435* (2013.01); *B60K 6/48* (2013.01); *F02M 33/04* (2013.01); *B60W 10/06* (2013.01); *F02M 23/12* (2013.01); *Y02T 10/146* (2013.01); *B60W 20/00* (2013.01)
USPC .......................................... 123/559.1; 60/611

(58) Field of Classification Search
USPC ................... 123/559.1, 520, 516, 518, 198 D
See application file for complete search history.

(56) References Cited

U.S. PATENT DOCUMENTS 4,191,013 A * 3/1980 Katahira et al. ................ 60/276
4,463,554 A * 8/1984 Sudbeck et al. ................ 60/274
(Continued)

FOREIGN PATENT DOCUMENTS

JP 2008038706 A 2/2008
WO 2008012005 A1 1/2008
WO WO 2008093203 A1 * 8/2008

OTHER PUBLICATIONS

International Search Report and Written Opinion ; date of mailing :Sep. 2, 2010 ; for International Application PCT/US2010/022468 ; 9 pages.

*Primary Examiner* — Kenneth Bomberg
*Assistant Examiner* — Shafiq Mian
(74) *Attorney, Agent, or Firm* — BrooksGroup

(57) ABSTRACT

One embodiment includes a combination including a secondary air pump; and a first control valve constructed and arranged to control flow of air into the secondary air pump from one or more lines connected to the first control valve; and/or a second control valve constructed and arranged to control flow of air from the secondary air pump through one or more lines connected to the second control valve. The combination being particularly useful in a system including a combustion engine.

19 Claims, 1 Drawing Sheet

(56) References Cited

U.S. PATENT DOCUMENTS

| | | | |
|---|---|---|---|
| 5,022,375 A * | 6/1991 | Goto et al. | 123/564 |
| 5,220,898 A * | 6/1993 | Kidokoro et al. | 123/520 |
| 5,273,020 A * | 12/1993 | Hayami | 123/520 |
| 5,291,871 A * | 3/1994 | Shirai | 123/564 |
| 5,533,479 A * | 7/1996 | Wild et al. | 123/520 |
| 5,918,580 A * | 7/1999 | Hennrich et al. | 123/520 |
| 5,979,418 A * | 11/1999 | Saruwatari et al. | 123/519 |
| 6,378,511 B1 * | 4/2002 | Wolters et al. | 123/575 |
| 7,107,758 B2 * | 9/2006 | Hirooka | 60/277 |
| 7,222,483 B2 * | 5/2007 | Oi et al. | 60/289 |
| 2004/0025851 A1 * | 2/2004 | Krimmer et al. | 123/522 |
| 2006/0048504 A1 * | 3/2006 | Oi et al. | 60/289 |
| 2011/0179780 A1 * | 7/2011 | Sugihara | 60/317 |

\* cited by examiner

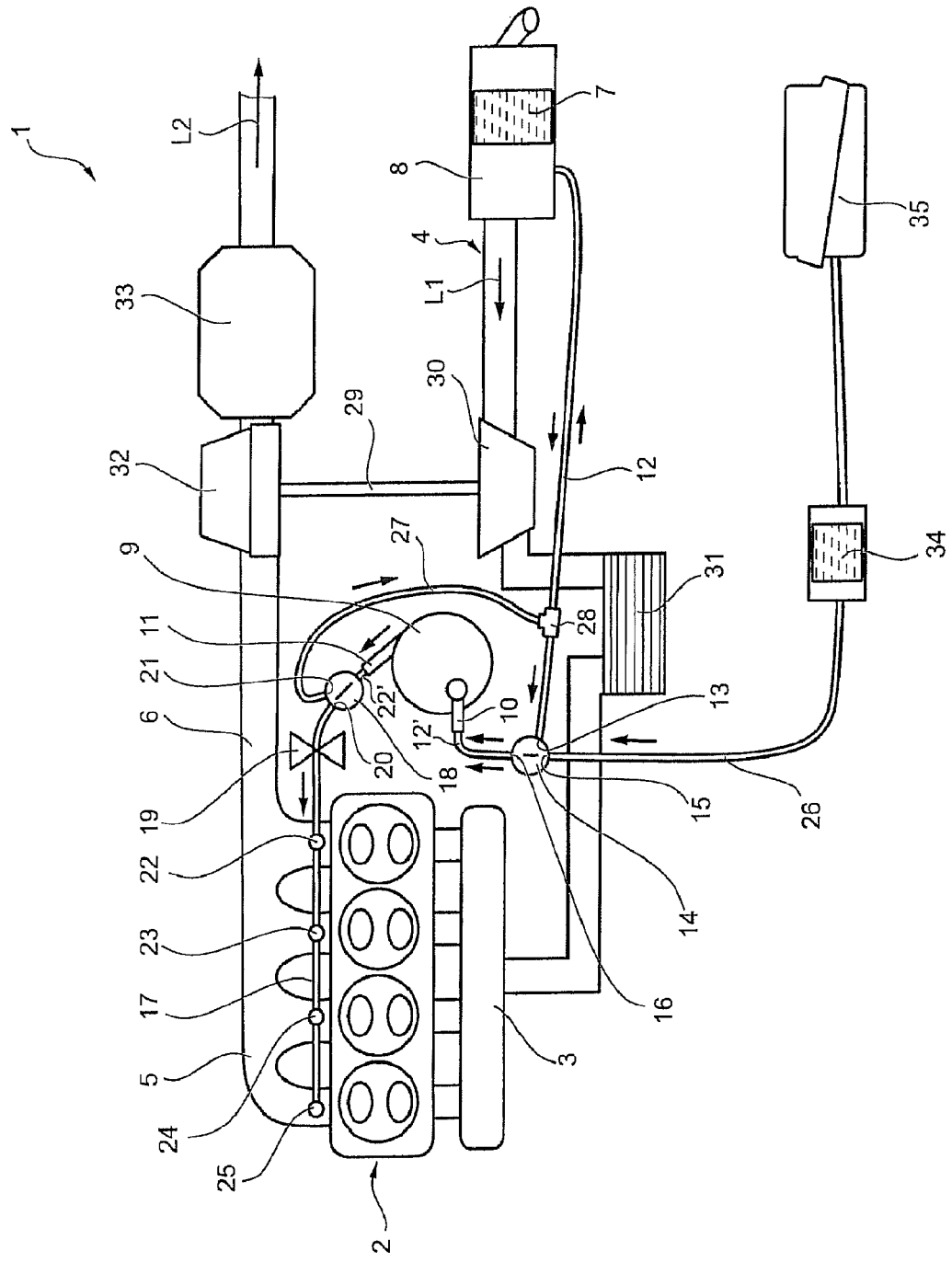

DRIVE DEVICE

The invention relates to a drive device as claimed in claim 1.

In drive devices which are designed as supercharged internal combustion engines and/or as hybrid drives (internal combustion engine in combination with an electric motor), it is often no longer possible to generate a vacuum in the vehicle by means of an intake negative pressure in order to ensure an air supply to emissions-relevant components in the internal combustion engine, the exhaust-gas turbocharger and/or activated carbon filters. Although so-called "electric secondary air pumps" are installed in some vehicles for emissions reasons, said electric secondary air pumps are however generally operated only in the first 30 seconds after the engine is started for the purpose of heating the catalytic converter.

It is therefore an object of the present invention to create a drive device which enables a permanent air supply to different emissions-relevant components in the internal combustion engine, preferably in combination with an activated carbon regeneration of the fuel tank in order to avoid fuel vapors.

Said object is achieved by means of the features of claim 1.

A significant advantage of the drive device according to the invention is the possibility of being able to supply air to a plurality of emissions-relevant components simultaneously, and therefore in a cost-effective fashion, using a single air pump which can preferably be operated continuously.

According to the invention, a system for a permanent air supply to all emissions-relevant components is correspondingly created, with preferably at least two 3/2-way valves as control devices or control valves, and a connecting device, preferably in the form of a T-connecting piece, being installed into the line conduits of the drive device. With said components, the respective operating states of the drive device can be activated, and two or more of the objects specified above can be fulfilled by means of a single pump. With the fundamental use, in principle, of further control valves, again preferably in the form of 3/2-way valves (or else other suitable control units), further tasks, for example fuel reformation or diesel particle filter regeneration, could also be assisted by means of a system of said type using only a single pump. This makes a high cost saving potential possible and entails a comprehensive weight reduction and installation space saving for future vehicle concepts.

With the drive device according to the invention, it is possible to realize at least the following two operating states:

Operating state 1: The drive device according to the invention enables a secondary supply of air over for example approximately 10 to 60 seconds after a cold start of the internal combustion engine or after the end of a period of purely electric driving operation, relatively long recuperative braking or start-stop situations and a re-start of the internal combustion engine, if the drive device according to the invention is a hybrid drive for a hybrid vehicle. The secondary air supply into the outlet manifold serves which takes place in said operating state, in conjunction with an additional injection of fuel (additional late injection), serves for re-heating a 3-way catalytic converter to its conversion temperature. In said first operating state, by the secondary air pump, from a clean air region of an engine filter (which, in the case of a supercharged engine, is situated upstream of the compressor wheel of the exhaust-gas turbocharger) and forces the secondary air via control valves and a secondary air valve into the outlet manifold.

Operating state 2: This operating state involves an activated carbon filter regeneration and evacuation of fuel vapors during the operation of the internal combustion engine. During the electric operation of a hybrid drive, the fuel vapors cannot be conducted through the internal combustion engine and burned in order to thereby be released in an emissions-conforming and environmentally compatible manner (elimination of benzol compounds, hydrocarbon compounds etc.). The accumulation in the activated carbon filter simply bridges the possible periods of electric driving operation, which may possibly also be of relatively long duration.

In the drive device according to the invention, in said operating state, as in the first operating state mentioned further above, it is made possible by means of a corresponding actuation of the control valves to conduct fuel vapors out of the fuel ventilation line via a connecting piece into the secondary air line between the engine filter and the first control valve (upstream of the pump inlet) by means of the air pump. The fuel vapors are then conducted into the intake region of the internal combustion engine. To simplify matters in terms of installation space and to reduce costs, it may preferably be provided that for example rubber hose or plastic corrugated pipe connections of the existing secondary air line be used for the two operating states explained above.

The subclaims relate to advantageous refinements of the invention.

Further details, advantages and features of the present invention can be gathered from the following description of an exemplary embodiment on the basis of the drawing.

The single FIGURE of the drawing shows a schematically highly simplified illustration of a drive device 1 according to the invention which may be designed for example either as an internal combustion engine 2 which is supercharged by means of an exhaust-gas turbocharger 29, or as a hybrid drive in which the internal combustion engine 2 interacts in the usual way with an electric motor (not illustrated in the FIGURE).

The internal combustion engine 2 has an intake manifold 3 which is connected to an air intake line 4. The internal combustion engine 2 also has an outlet manifold 5 which is connected in the usual way to an exhaust line 6.

In the embodiment illustrated in the FIGURE, the drive device 1 also has an engine air filter 7 which is arranged in the air intake line 4 and which has a clean air region 8.

Furthermore, the drive device 1 has a secondary air pump 9 which has a pump inlet 10 and a pump outlet 11. Furthermore, an air feed line is provided which is denoted by the reference symbols 12 and 12'. Here, the portion 12 of the air feed line runs from the clean air region 8 of the air filter 7 to a first inlet 13 of a first control valve 14 which, in the example, is designed as a 3/2-way valve. Proceeding from an outlet 16 of the control valve 14, the second portion 12' of the air feed line runs to the pump inlet 10 of the secondary air pump 9.

Furthermore, a secondary air line 17 is provided which is connected at one of its ends to the pump outlet 11 and runs from there to an inlet 22' of a second control valve 18 which has a first outlet 20 and a second outlet 21. Proceeding from the first outlet 20, the secondary air line 17 runs via a secondary air valve 19 to openings 22 to 25 of the secondary air line 17 into the outlet manifold 5, as shown in detail in the FIGURE. By means of said arrangement, it is possible to realize the first operating state explained in the introduction, in which the secondary air pump 9 sucks in air from the clean air region 8 via the correspondingly activated first control valve 14 and feeds said air via the second correspondingly activated control valve 18 and the secondary air valve 19 into the outlet manifold 5 of the internal combustion engine 2.

The drive device 1 according to the invention also has a fuel tank 35 which is connected, with the interposition of an activated carbon filter 34, by means of a fuel ventilation line 26 to a second inlet 15 of the first control valve 14.

The second outlet 21 of the second control valve 18 is connected to a fuel vapor bypass line 27 which opens via a connecting piece 28, preferably in the form of a T-connecting piece, into that line portion 12 of the air feed line 12, 12' which is arranged upstream of the pump inlet 10. It is thereby possible for the fuel tank 35 or its fuel ventilation line 26 to be connected, by means of corresponding activation of the first and second control valves 14 and 18, via the secondary air pump 9 and the bypass line 27 and also the connecting piece 28 to the line portion 12 of the air feed line 12, 12', thereby enabling the second operating state mentioned above, in which the fuel vapors can then be supplied to the intake manifold 3 or the intake side of the internal combustion engine 2 for the purpose of reducing emissions.

The activation of the control valves 14 and 18 as explained above may take place either by means of corresponding electrical actuators or by means of pressure activation, so as to make the connections explained above possible in order to obtain the desired operating states.

As can also be seen from the illustration of the FIGURE, the drive device 1 has, in addition to the components explained above, an exhaust-gas turbocharger 29 whose compressor 30 is arranged in the air intake line 4, between the air filter 7 and an intake air cooler 31 as viewed in the flow direction L1 of the intake air.

Furthermore, a catalytic converter 33 is arranged in the exhaust line 6, downstream of a turbine 32 of the exhaust-gas turbocharger 29 as viewed in the flow direction L2 of the exhaust gases.

In addition to the written explanation of the invention, reference is hereby explicitly made, to complete the disclosure, to the illustration of the invention in the drawing.

LIST OF REFERENCE SYMBOLS

1 Drive device
2 Internal combustion engine
3 Intake manifold
4 Air intake line
5 Outlet manifold or exhaust manifold
6 Exhaust line
7 Engine air filter
8 Clean air region
9 Air pump/secondary air pump
10 Pump inlet/first pump port
11 Pump outlet/second pump port
12, 12' Air feed line or portions 12 and 12' of the air feed line
13 First inlet of the control valve 14
14 First control valve
15 Second inlet of the control valve 14
16 Outlet of the first control valve 14
17 Secondary air supply line
18 Second control valve
19 Secondary air valve
20 First outlet of the second control valve 18
21 Second outlet of the second control valve 18
22' Inlet of the second control valve 18
22-25 Openings
26 Fuel ventilation line
27 Fuel vapor bypass line
28 Connecting piece/T-connecting piece
29 Exhaust-gas turbocharger
30 Compressor
31 Intake air cooler
32 Turbine
33 Exhaust-gas catalytic converter
34 Activated carbon filter
35 Fuel tank
L1 Flow direction of the intake air
L2 Flow direction of the exhaust gases

The invention claimed is:

1. A product, comprising:
   an internal combustion engine connected to an air intake line;
   an air pump comprising a pump inlet and a pump outlet;
   an air feed line connecting the pump inlet to a clean air region of the air intake line;
   a secondary air supply line connecting the pump outlet to an outlet manifold of the internal combustion engine;
   a first control valve arranged in the air feed line, the first control valve comprising two inlets and one outlet; and
   a second control valve arranged in the secondary air supply line, the second control valve comprising one inlet and two outlets.

2. The product of claim 1, further comprising:
   a fuel ventilation line connecting a fuel tank to one of the two inlets of the first control valve; and
   a fuel vapor bypass line connecting one of the two outlets of the second control valve to the air feed line.

3. The product of claim 2, further comprising an activated carbon filter arranged in the fuel ventilation line.

4. The product of claim 1, further comprising:
   an exhaust-gas turbocharger comprising a compressor arranged in the air intake line and a turbine arranged in an exhaust line connected to the outlet manifold.

5. The product of claim 1, wherein at least one of the control valves is a 3/2-way valve.

6. The product of claim 1, wherein at least one of the control valves is pressure activated.

7. The product of claim 1, wherein at least one of the control valves is electrically actuated.

8. The product of claim 1, wherein the air pump is constructed and arranged such that it can operate continuously.

9. A product, comprising:
   an internal combustion engine connected to an air intake line;
   an air pump comprising a pump inlet and a pump outlet;
   a fuel ventilation line connecting a fuel tank to the pump inlet;
   a fuel vapor bypass line connecting the pump outlet to a clean air region of the air intake line;
   a first control valve arranged in the fuel ventilation line, the first control valve comprising two inlets and one outlet; and
   a second control valve arranged in the fuel vapor bypass line, the second control valve comprising one inlet and two outlets.

10. The product of claim 9, further comprising:
    an air feed line connecting the clean air region to one of the two inlets of the first control valve; and
    a secondary air supply line connecting one of the two outlets of the second control valve to an output manifold of the internal combustion engine.

11. The product of claim 10, further comprising a secondary air valve arranged in the secondary air supply line.

12. The product of claim 9, wherein the first control valve comprises a 3/2-way valve in which one of the two inlets is connected to the clean air region.

13. The product of claim 9, wherein the second control valve comprises a 3/2-way valve in which one of the two outlets is connected to an outlet manifold of the internal combustion engine.

14. The product of claim 9, further comprising an activated carbon filter arranged in the fuel ventilation line.

15. A method comprising:
providing an air pump constructed and arranged to provide air along a flow path from a clean air region of an air intake line of an internal combustion engine to an exhaust manifold of the internal combustion engine; and
operating a first control valve and a second control valve arranged along the flow path so that the air pump provides fuel vapor from a fuel tank to the clean air region;
wherein the first control valve comprises first and second inlets and an outlet; and
wherein the second control valve comprises first and second outlets and an inlet.

16. The method of claim 15, wherein the step of operating includes decreasing fluid flow into one of the inlets of the first control valve and increasing fluid flow into the other one of the inlets of the first control valve.

17. The method of claim 15, wherein the step of operating includes decreasing fluid flow out of one of the outlets of the second control valve and increasing fluid flow out of the other one of the outlets of the second control valve.

18. The method of claim 15, wherein one of the control valves is connected to a pump inlet and the other of the control valves is connected to a pump outlet.

19. The method of claim 15, wherein after the step of operating, a fluid flow direction along at least a portion of the air intake line is in a direction opposite to the direction of flow prior to the step of operating.

* * * * *